(12) United States Patent
Riggenmann

(10) Patent No.: US 11,638,922 B2
(45) Date of Patent: May 2, 2023

(54) IMPACT CRUSHER

(71) Applicant: Michael Riggenmann, Weissenhorn (DE)

(72) Inventor: Michael Riggenmann, Weissenhorn (DE)

(73) Assignee: TRENN-UND SORTIERTECHNIK GMBH, Weissenhorn (DE)

( * ) Notice: Subject to any disclaimer, the term of this patent is extended or adjusted under 35 U.S.C. 154(b) by 229 days.

(21) Appl. No.: 16/999,107

(22) Filed: Aug. 21, 2020

(65) Prior Publication Data

US 2021/0053069 A1 Feb. 25, 2021

(30) Foreign Application Priority Data

Aug. 21, 2019 (DE) .............................. 102019005889

(51) Int. Cl.
| | |
|---|---|
| *B02C 13/16* | (2006.01) |
| *B02C 13/284* | (2006.01) |
| *B02C 13/14* | (2006.01) |
| *B02C 13/18* | (2006.01) |
| *B02C 13/28* | (2006.01) |
| *B02C 13/282* | (2006.01) |
| *B02C 13/30* | (2006.01) |

(52) U.S. Cl.
CPC ............ *B02C 13/284* (2013.01); *B02C 13/14* (2013.01); *B02C 13/16* (2013.01); *B02C 13/1835* (2013.01); *B02C 13/28* (2013.01); *B02C 13/282* (2013.01); *B02C 13/30* (2013.01); *B02C 2013/2808* (2013.01)

(58) Field of Classification Search
CPC .............. B02C 13/284; B02C 13/2808; B02C 13/282; B02C 13/28; B02C 13/14; B02C 13/16

See application file for complete search history.

(56) References Cited

U.S. PATENT DOCUMENTS

| | | | | |
|---|---|---|---|---|
| 1,586,282 A | * | 5/1926 | Bryant ..................... | B02C 13/14 241/154 |
| 1,636,033 A | * | 7/1927 | Agnew ................... | B02C 13/14 241/154 |
| 1,669,239 A | * | 5/1928 | Grindle ................... | B02C 13/14 241/43 |
| 1,798,465 A | * | 3/1931 | Grindle ................... | B02C 13/28 241/82 |
| 1,955,960 A | * | 4/1934 | Hirsch .................... | B02C 13/14 241/194 |

(Continued)

FOREIGN PATENT DOCUMENTS

GB 2131722 A * 6/1984 ............ B02C 13/16

*Primary Examiner* — Faye Francis
(74) *Attorney, Agent, or Firm* — Andrew Wilford

(57) ABSTRACT

An impact crusher for grinding and separating solid material has a base, a rotor on the base having an upright shaft defining an upright rotor axis about which the rotor is rotatable, and a drum fixed on the base, spacedly surrounding the rotor, and formed by a pair of generally semicylindrical drum shells fitted together at a plane including the rotor axis. An array of axially extending and angularly substantially equispaced replaceable ribs is provided on an inner surface of the drum. A plurality of impact hammers are angularly substantially equispaced around the rotor and orbitable past the ribs on rotation of the rotor.

11 Claims, 4 Drawing Sheets

(56) References Cited

U.S. PATENT DOCUMENTS

| | | | | |
|---|---|---|---|---|
| 2,329,208 | A * | 9/1943 | Lykken | B02C 13/14 241/59 |
| 2,355,784 | A * | 8/1944 | Dondlinger | F23K 1/00 241/188.1 |
| 2,440,285 | A * | 4/1948 | Lykken | B02C 13/14 241/43 |
| 2,695,755 | A * | 11/1954 | Denovan | B02C 13/28 241/4 |
| 2,700,511 | A * | 1/1955 | Denovan | B02C 13/14 241/154 |
| 3,329,350 | A * | 7/1967 | Wisgerhof | B02C 13/18 241/38 |
| 4,087,052 | A * | 5/1978 | Rohrbach | B02C 13/14 241/162 |
| 4,373,679 | A * | 2/1983 | Kawano | B02C 13/1814 241/275 |
| 5,046,670 | A * | 9/1991 | Leikin | B02C 13/28 241/275 |
| 5,067,661 | A * | 11/1991 | Eide | B02C 18/16 241/DIG. 38 |
| 9,403,167 | B2 * | 8/2016 | Watts | B02C 13/09 |
| 9,498,780 | B2 * | 11/2016 | Watts | B02C 13/14 |
| 9,707,564 | B2 * | 7/2017 | Mogan | B02C 13/18 |
| 10,376,894 | B2 * | 8/2019 | Sontag | B02C 13/288 |
| 10,493,461 | B2 * | 12/2019 | Shirai | B02C 13/14 |
| 11,298,703 | B2 * | 4/2022 | Lutoslawski | B02C 13/14 |
| 2008/0185466 | A1 * | 8/2008 | Howard | B02C 13/282 241/188.1 |
| 2012/0119003 | A1 * | 5/2012 | Watts | B02C 7/02 241/101.2 |
| 2016/0144371 | A1 * | 5/2016 | Sontag | B02C 13/16 241/47 |
| 2020/0269252 | A1 * | 8/2020 | Bano | B02C 13/16 |

* cited by examiner

IMPACT CRUSHER

FIELD OF THE INVENTION

The present invention relates to an impact crusher. More particularly this invention concerns an impact crusher for comminuting hard material into particles.

BACKGROUND OF THE INVENTION

An impact crusher for grinding solid material, particularly waste material, as well as for separating composite material made of metals, plastics, mineral substances and the like, comprises a rotor on a machine base and having a upright rotor shaft as well as a drum surrounding the rotor shaft with clearance and is provided on its inner surface with replaceable ribs running axially of the rotor shaft. The rotor is provided with also replaceable impact hammers adjacent the ribs, the ribs and the impact hammers being essentially evenly distributed angularly around the axis of the rotor.

Such devices are known from the prior art and are used to separate composite material, particularly by crushing. Of particular significance are metal and plastic composites, but composite material that consist of various metals or also various plastics can also be crushed. Separation is achieved by the fact that the physical properties of the individual components of the composite material differ so that when the material strike the ribs or the impact hammers, a different elastic or plastic deformation is achieved as a result of which separation occurs.

Since such impact crushers, when used as intended, are subject to substantial wear of the impact tools, regular maintenance or replacing the impact tools is necessary. This typically requires laborious disassembly and assembly work.

OBJECTS OF THE INVENTION

It is therefore an object of the present invention to provide an improved impact crusher that overcomes the above-given disadvantages, in particular in which both the impact hammers as well as grinding ribs are accessed with little effort so that inspection and a cleaning, as well as replacement that may have become necessary if applicable, can also be performed in a simple manner with little time involved.

SUMMARY OF THE INVENTION

An impact crusher for grinding and separating solid material has according to the invention a base, a rotor on the base having an upright shaft defining an upright rotor axis about which the rotor is rotatable, and a drum fixed on the base, spacedly surrounding the rotor, and formed by a pair of generally semicylindrical drum shells fitted together at a plane including the rotor axis. An array of axially extending and angularly substantially equispaced replaceable ribs is provided on an inner surface of the drum. A plurality of impact hammers are angularly substantially equispaced around the rotor and orbitable past the ribs on rotation of the rotor.

The advantage of the invention is essentially that the bisection of the drum makes possible a simple separation of the two drum half-shells so that not only do the drum inner surfaces fitted with the grinding ribs become readily accessible, but similarly so does the rotor with the impact hammers.

In a preferred embodiment of the invention, that every drum half-shell is connected near its axially running border to a pivot shaft parallel to the rotor shaft. In this way, the two drum half-shells—once separated from each other—can be simply pivoted open so that the drum half-shells remain connected for further work on the impact crusher, which simplifies the inspection as well as mechanical tasks for replacing the grinding ribs.

In an advantageous design of the invention, the pivot shafts are thereby mounted with their lower end on the machine base and with their upper end in a U-shaped machine frame crossing over and connected to the machine base.

It is hereby also advantageous if the drum half-shells are mounted in an axially displaceable manner on the pivot shafts. One can hereby slightly lift the drum half-shells from the machine base for the purpose of pivoting open said half-shells.

To absorb the high forces acting on the drum when in operation, the invention provides that the drum half-shells are screwed together at their axially running borders and/or have their border abutting the machine base screwed to said machine base.

Furthermore, it is provided within the scope of the invention that the drum half-shells have their border facing away from the machine base closed by a semicircular lid, wherein the lid is provided with a fill/inlet air port. In this way, the impact crusher can be continuously fed the composite material to be separated.

In a corresponding manner, it is provided that a material discharge/outlet air port is provided inside the drum in the bottom of the machine base.

In addition, it has proven to be advantageous if the rotor shaft is mounted in a bearing on the machine base as well as on the machine frame between the pivot shafts.

The grinding ribs advantageously rest in a groove of the door halves and alternatingly have a variable radial height. In this way, the grinding ribs each protruding radially further inward form suitable edges at which the composite material can be crushed.

Depending on the design of the invention, the rotor may have one or more rotor plates arranged in an axially offset manner, on which the impact hammers are pivotably mounted.

Lastly, it is advantageous if the distance between the impact hammers and the grinding ribs decreases vertically downward. In this way, a coarse grinding occurs in the upper region initially, wherein the degree of grinding increases in a downward direction due to the decreasing distance. The throughput in material can be increased by an air current being generated via the inlet air or outlet air port.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
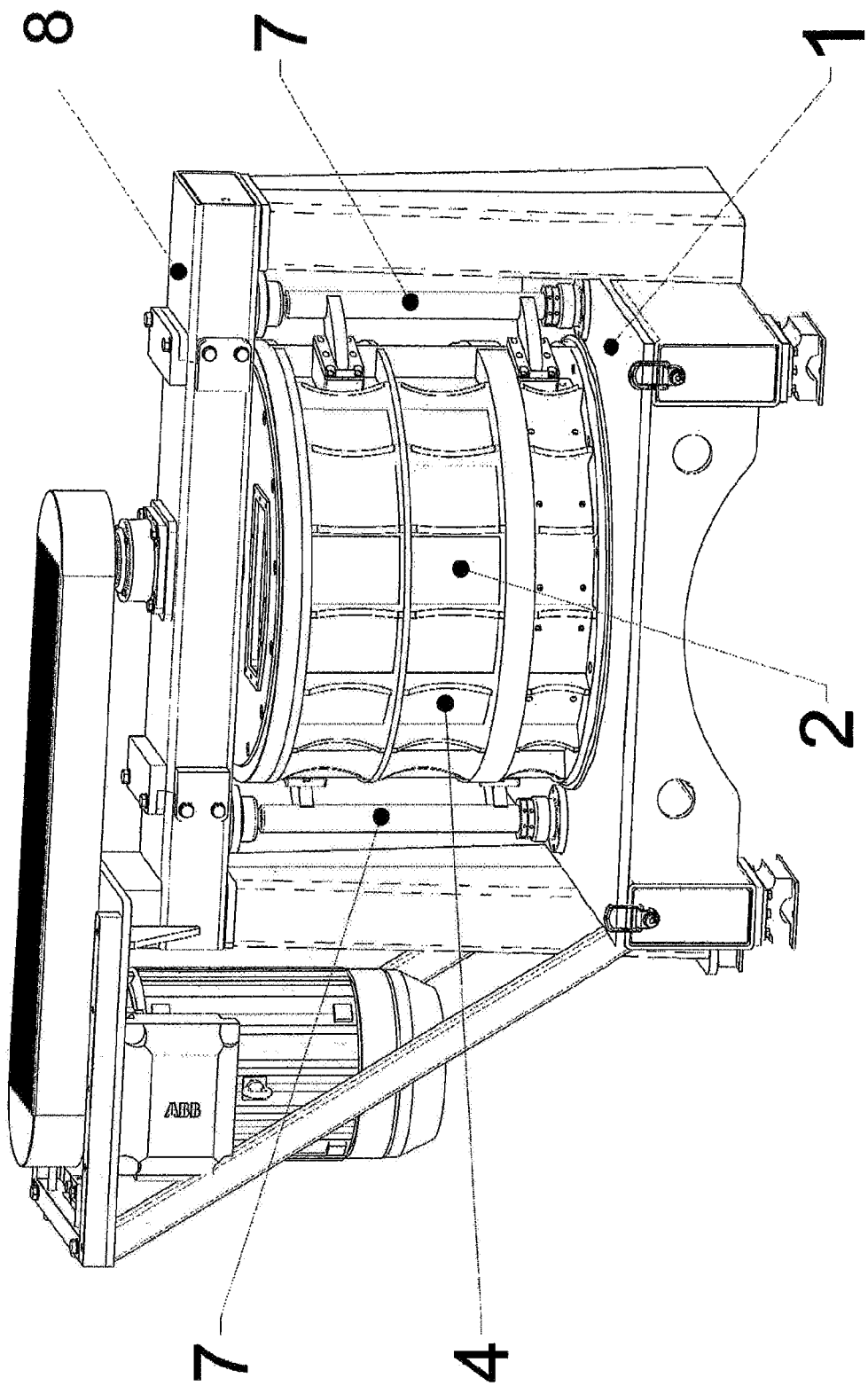
FIG. 1 is a perspective view from above of an impact crusher when closed.

The impact crusher depicted in the drawing is used for grinding solid material, particularly waste material, as well as for separating composite material made of metals, plastics, mineral substances and similar. It comprises a rotor 2 mounted on a machine base 1 and having an upright or vertical rotor shaft 3 defining an axis A, as well as a drum 4 spacedly surrounding the rotor 2. To grind solid material, the drum 4 is provided on its inner surface with replaceable ribs 5 extending axially of the rotor shaft 3. The rotor 2 is also provided with arrays of replaceable and pivotal impact hammers 6 working together with but spaced from the ribs 5. The ribs 5 and the impact hammers 6 are angularly evenly distributed about the upright rotor axis A.

Figure 3:
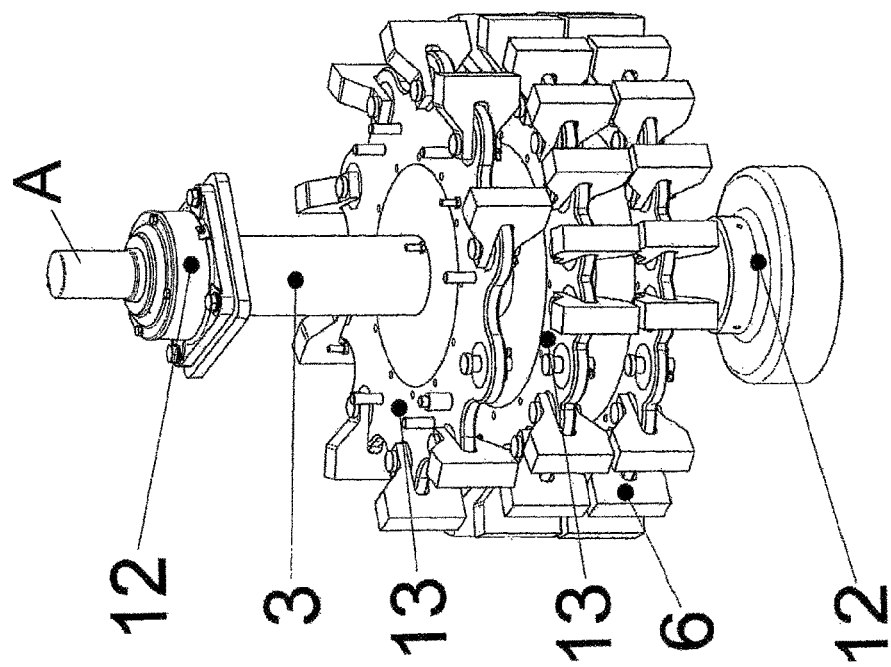
FIG. 3 is a view of the rotor and its impact hammers.

According to FIG. 3, the rotor 2 also has a plurality of rotor plates 13 extending radially from and spaced axially along the shaft 3, while being pivotable and axially shiftable as needed, although while in use they are axially and angularly fixed to the shaft 3. Each rotor plate 13 has for each impact hammer 6 a respective detachable adjusting disk 14 on which the respective impact hammer 6 is eccentrically secured by a pivot pin 15. On the one hand, there is the possibility that the impact hammers 6 can individually pivot back and avoid very hard material so that jamming of the rotor 2 is prevented. On the other hand, loosening the pivot pin 15 allows for the simple replacement of the impact hammers 6. A side-mounted motor 17 drives the shaft 3.

Figure 5:
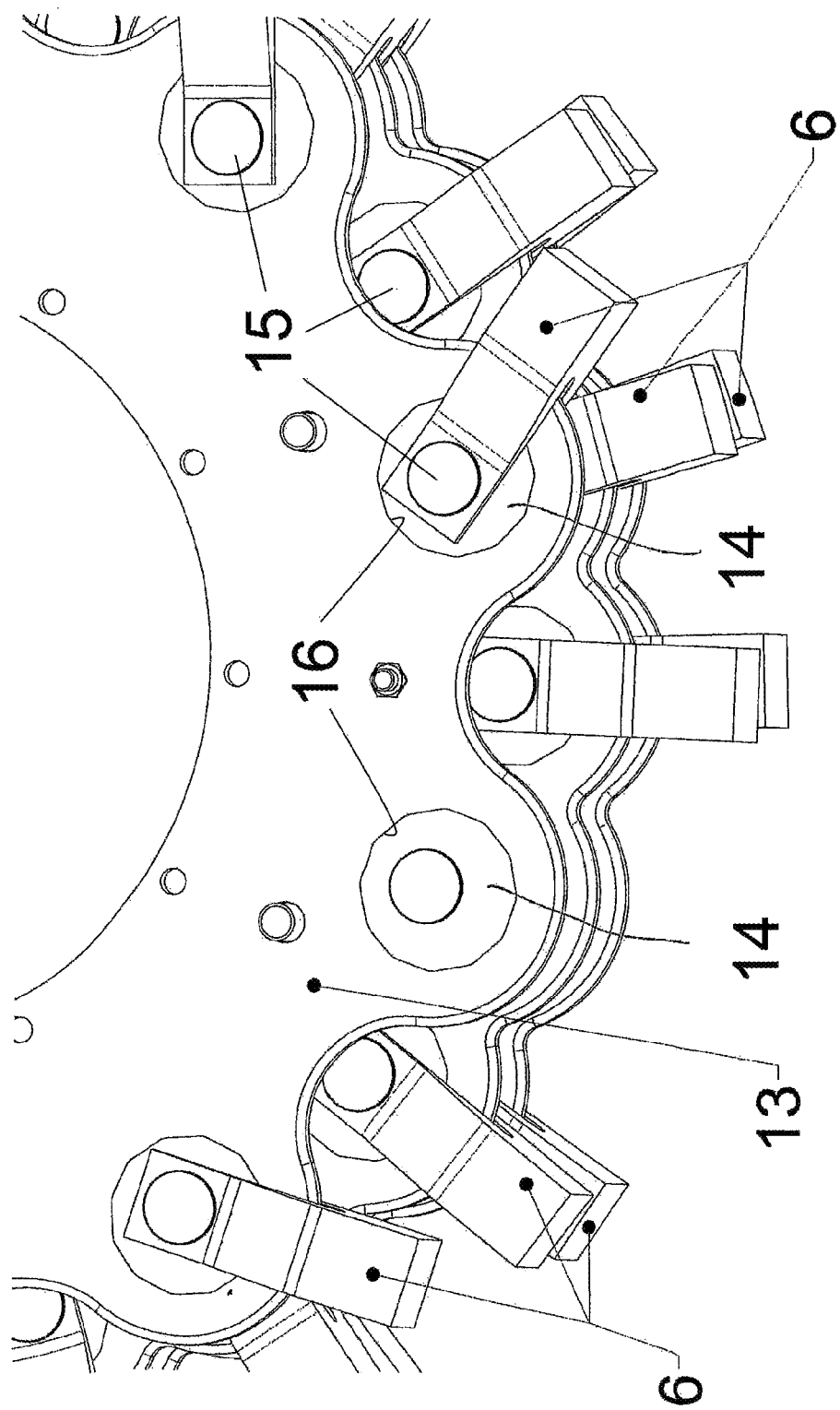
FIG. 5 is a large-scale detail view of a rotor plate having the pivotal impact hammers.

As one can seen in FIG. 5, a radial outer edge of each disk 14 is formed as a regular polygon, and each adjusting disk 14 is set in a respective complementary seat or hole 16 in the plate 13 so that the angular position of the disk 14 can be varied with respect to the rotor plate 13, thereby adjusting a radial spacing between the respective hammer axis defined by the respective pin 15 and the axis A. The number of sides of the polygon can be selected in a largely arbitrary manner, and here the outer edge of each adjusting disk 14 is a dodecagon. The adjusting disks 14 are secured to the rotor plate 13 by complementary fit of the outer edge of each disk 14 and the complementary inner edge of the respective mounting hole 16, and unillustrated formations ensure that the disks 14 are secured in the respective plates 13 during operation of the crusher.

Furthermore, one can see in FIG. 5 that the impact hammers 6 each have a U-shaped inner end into which the edge of the plate 13 and the respective disk 14 engage to grasp around the rotor plate 13 on both sides and are connected to the adjusting disk 14 by the respective pivot pin 15.

Figure 2:
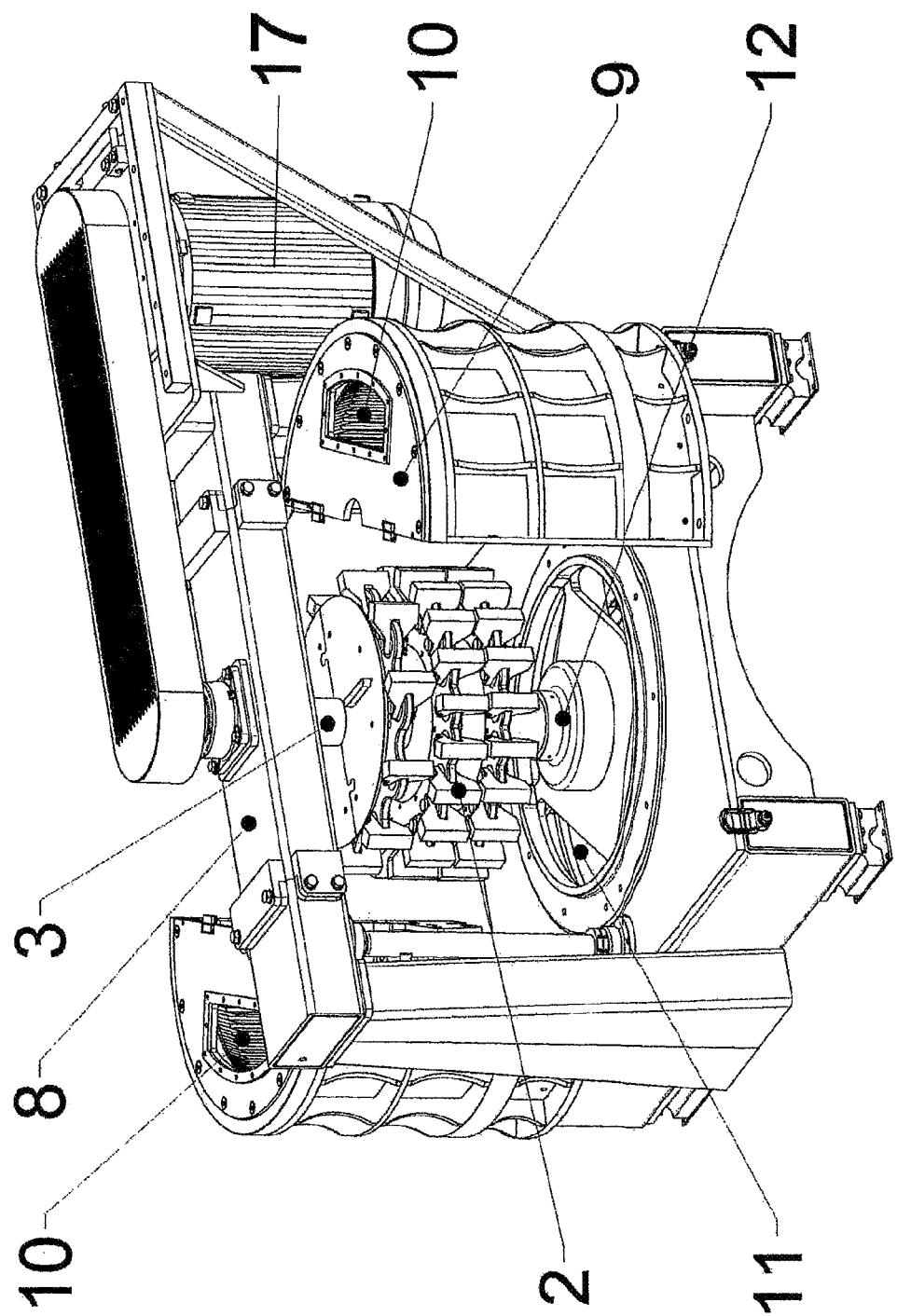
FIG. 2 shows the crusher of FIG. 1 with the shells forming the drum open.
Figure 4:
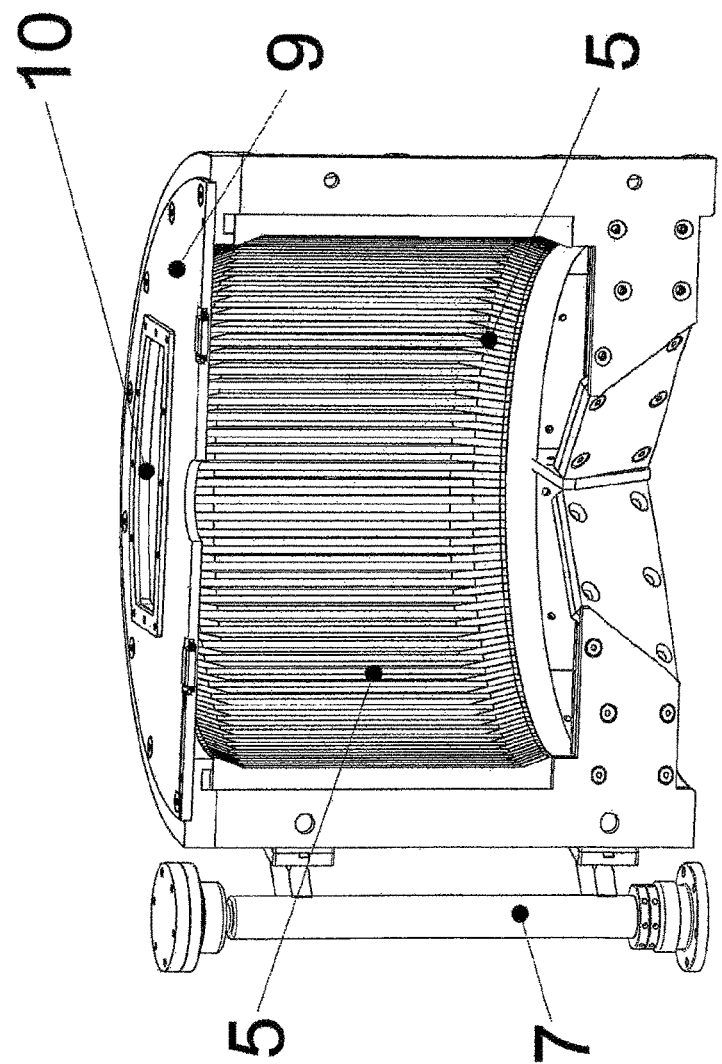
FIG. 4 is a view of the inner surface of one of the drum shells.

As one can see particularly in FIG. 2, the drum 4 is formed of two identical semicylindrical half-shells 4.1 and 4.2 that are separable from each other and join at a plane including the axis A of the rotor shaft 3. Two mutually same-sized drum half-shells 4.1 and 4.2 are hereby created, which can be easily separated from each other for maintenance work.

As one can also see in FIGS. 1 and 2, each of the two drum half-shells 4.1 and 4.2 is connected at one of its axially extending edges to a respective pivot shaft 7 that is parallel to the rotor shaft 3. The pivot shafts 7 are thereby mounted with their lower end on the machine base 1 and with their upper end on a horizontal upper leg of a recumbent U-shaped machine frame or arm 8 connected to the machine base 1 and crossing it. These shafts 7 diametrically flank the rotor shaft 3.

To easily pivot open the drum half-shells 4.1 and 4.2, they are axially displaceable on the pivot axes 7. This makes opening easier by slightly raising the drum half-shells 4.1 and 4.2, particularly when ground solid material, which can cause friction when opening, has gotten between the lower edge of the drum half-shell and the machine base 1.

To properly absorb the high forces that occur when operating, the drum half-shells 4.1 and 4.2 are bolted at their axially extending edges to each other and/or have their upper and lower edges abutting the machine base 1 bolted to the machine base 1 and arm 8. As one can see in FIGS. 1 to 3, the drum half-shells 4.1 and 4.2 are each closed at their upper end facing away from the machine base 1 by a respective semicircular plate or lid 9. This lid 9 is formed with an intake fill port 10 used on the one hand for the filling with solid material to be ground; at the same time, this port 10 can also be used for supply air.

Similarly, inside the drum 4 at the bottom of the machine base 1, there is provided a discharge or output port 11 through which the ground material on the one hand and exhaust air on the other can be discharged.

The rotor shaft 3 is also mounted in a bearing 12 on the machine base 1 at its lower end as well as on the machine frame 8 on its upper end between the pivot shafts 7.

In the drawing, the ribs 5 rest in a manner not further shown in respective grooves of the drum half-shells 4.1 and 4.2 and have in an alternating manner a variable radial height so that the radially inward protruding ribs 5 grind the solid material.

As shown in FIG. 3, the rotor 3 has a plurality of rotor plates 13 axially offset from one another along the rotor shaft arranged in an axially offset manner, on which the impact hammers 6 are pivotably mounted. On the one hand, there is the possibility that the impact hammers 6 can individually avoid very hard materials so that blocking of the rotor 2 is prevented; on the other hand, loosening the hinge bolt allows for the simple replacement of the impact hammers 6.

Last, the arrangement of the impact hammers 6 is selected in such a manner that the distance between them and the ribs 5 decreases vertically downward so that a continuous grinding of the solid material occurs on the way from the fill port 10 at the top to the discharge port 11 at the bottom.

What is claimed is:

1. An impact crusher for grinding and separating solid material, the crusher comprising:
    a base;
    a rotor on the base having an upright rotor shaft defining an upright rotor axis about which the rotor is rotatable;
    a drum on the base, spacedly surrounding the rotor, and formed by a pair of drum half-shells fittable together at a plane including the rotor axis and each having two axially extending outer edges;
    an array of axially extending and angularly spaced replaceable ribs on an inner surface of the drum;
    a plurality of impact hammers angularly spaced around the rotor and orbitable past the ribs on rotation of the rotor; and
    respective upright pivot shafts fixed in the base, extending parallel to the rotor shaft diametrically opposite one another, each engaging one of the edges of the respective half-shell, and each supporting the respective drum half shell for pivoting relative to the base between a closed position with the half shells together forming a tube laterally enclosing the rotor and with the edges of the tubes engaging one another and an open position with the half shells spread away from each other and exposing the rotor from two sides.

2. The impact crusher according to claim 1 wherein the base is provided above the rotor with a horizontal and radially extending arm in which upper ends of the pivot shafts are seated, lower ends of the pivot shafts being seated in the base.

3. The impact crusher according to claim 1, wherein the drum half-shells are axially shiftable relative to the respective pivot shafts.

4. The impact crusher according to claim 1, wherein in the closed position, axially extending edges of the drum half-shells are bolted to each other or axial end edges of the drum half shells are bolted to the base.

5. The impact crusher according to claim 1, wherein each drum half-shell is provided with a horizontal upper semicircular end plate.

6. The impact crusher according to claim 5, wherein at least one of the semicircular end plates is formed with an intake port.

7. The impact crusher according to claim 6, wherein the base is formed with an outlet port.

8. The impact crusher according to claim 1, further comprising an upper bearing on the base journaling an upper end of the rotor shaft and a lower bearing on the base journaling a lower end of the rotor shaft.

9. The impact crusher according to claim 1, wherein the drum is formed with respective axially extending and radially inwardly open grooves in each of which a respective one of the ribs is set.

10. The impact crusher according to claim 1, wherein the rotor has a plurality of axially spaced plates carrying the hammers.

11. The impact crusher according to claim 1, wherein a radial spacing between orbits of the hammers and inner edges of the ribs decreases vertically downward.

\* \* \* \* \*